April 26, 1927.  
J. T. CLARK  
PNEUMATIC TIRE  
Filed June 26, 1926
1,626,512
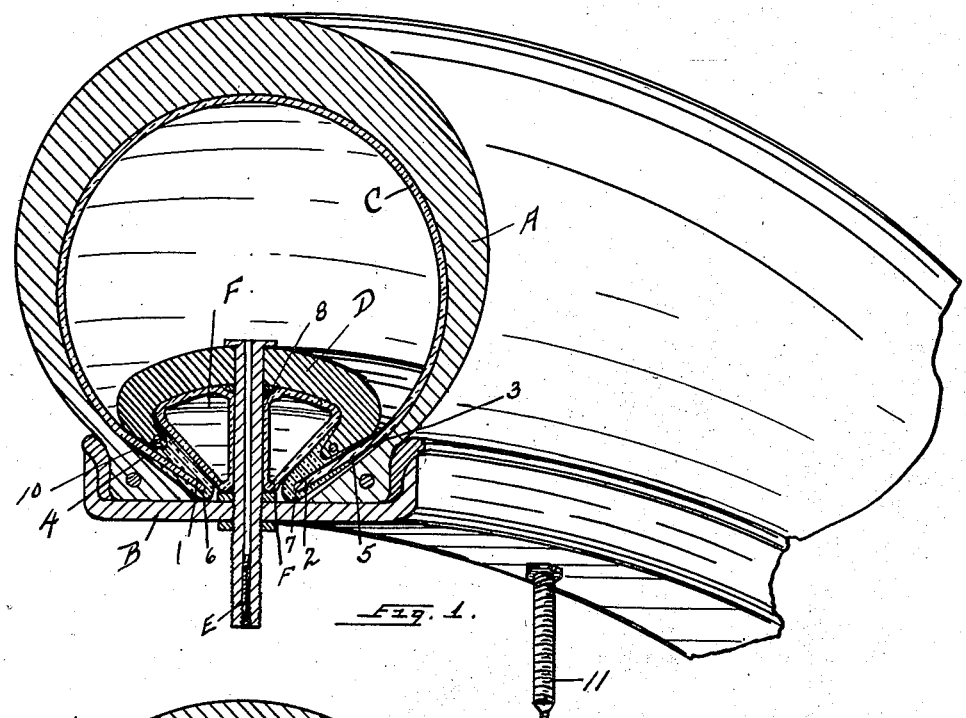
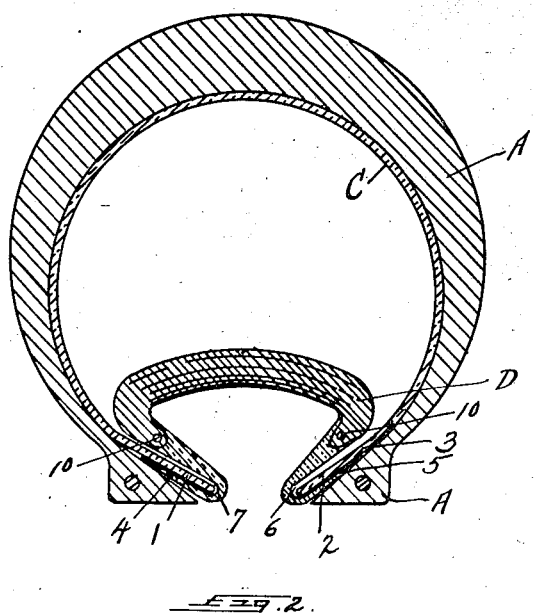
Inventor  
John T. Clark  
By R. M. Thomas  
Attorney Patented Apr. 26, 1927.

1,626,512

UNITED STATES PATENT OFFICE.

JOHN T. CLARK, OF PROVO, UTAH.

PNEUMATIC TIRE.

Application filed June 26, 1926. Serial No. 118,619.

My invention relates to tires for road vehicles and has for its object to provide a new and efficient pneumatic tire for automobiles.

A further object is to provide a tire for automobiles which will be easily mounted and dismounted and which will not puncture.

A still further object is to provide a pneumatic tire for automobiles which will require less air pressure than the commonly known tires, and one which will have a shock absorbing element within the outer casing.

A still further object is to provide a pneumatic tire which consists of an air inflated casing within an inflated outer casing, and which will prevent rim cutting and stone bruising of the outer casing.

These objects I accomplish with the tire shown in the accompanying drawings in which similar numerals and letters of reference indicate like parts throughout the several views and as described in the specification forming a part of this application and pointed out in the appended claims.

In the drawings of which I have shown the best and most preferred embodiment of my invention and manner of building my tire, Figure 1 is a diametrical perspective section of a tire with my improvements therein. Figure 2 is a diametrical section through my tire showing the inner casing therein.

In the drawings I have shown the outer or tread casing as A mounted on any suitable rim B. I provide an annular inner lining for the casing A, made of soft pure gum rubber C, having its inner edges 1 and 2 free from the inner edges of the casing A, as shown at 3. I also provide an inner casing D having extended edges 4 and 5 thereon, and which edges are made of soft rubber and sealed to the fabric of the casing D. Bead wires 10 are provided therein to hold the edges of said casing rigid. The said edges 4 and 5 are bent back upon themselves and form annular grooves 6 and 7 between their edges and the main body of the casing D. Within the said casing D I provide an inner tube F which has a sealed hole 8 therethrough. The inner tube F has the regular air valve 11 therein for inflating it, and through which hole 8 the inflation tube E is passed for inflating the casing A. An inflection tube E is passed through and secured to the inner casing D and is in open connection with the interior of the outer casing A, and has any commonly known check valve carried therein. When assembled, as shown in Figure 1, the edges 1 and 2 of the rubber lining C are placed in the annular grooves 6 and 7 of the inner casing D and the inner tube F is placed within the inner casing D. The edges 4 and 5 of the inner casing D are placed between the edges 1 and 2 and the bead portion of the outer casing. The tube E of the inner casing D is passed through the hole 8 in the inner tube F and the tire is then mounted on its rim B. Air is then introduced into the inner casing through the valve stem 11 until sufficient pressure has been introduced to seal the edges 1 and 2 in the grooves 6 and 7 and the edges 4 and 5 in between the edges 1 and 2 and the outer casing A. Air may then be introduced into the outer casing through the inflation tube E to any desired amount of pressure and the tire is ready for use. Should the tire become flat in the outer casing A the car will then be running upon the inner casing D and the tire will not be rim cut or stone bruised. When the outer casing is run with 25 pounds or less pressure therein the inner casing will be inflated to about 90 or 100 pounds and should the tire strike a hard object, such as a rock or a railroad track, the outer casing will strike against the inner casing D and the tire will not be injured in any way.

Having thus described my invention I desire to secure by Letters Patent and claim:

1. A vehicle tire comprising an outer casing; a liner secured therein, having its edges free from the edges of the casing; an inner casing concentric with said outer casing and carried therein; edges on said inner casing bent back upon themselves and adapted to fit between the edges of the liner and the edges of the outer casing; an inner tube within said inner casing; and means to inflate both of said casings.

2. A vehicle tire comprising an outer casing having a rubber liner secured therein, said liner having its edges free from the edges of the said outer casing; an inner casing concentric with said outer casing and carried therein; flanged edges on said inner casing bent back upon themselves and adapted to fit between the edges of the said rubber liner and said outer casing to form an air-tight seal; and means to inflate both of said casings.

3. A vehicle tire comprising an outer casing; a soft rubber liner carried therein and having its edges free from the edges of said outer casing; an inner casing carried in and concentric with said outer casing; flanged edges on said inner casing adapted to fit between the edges of the rubber liner and the outer casing; an inner tube within said inner casing having a valve stem and valve therein to inflate said tube; and another valve stem and valve therein secured through said inner casing and adapted to be used to inflate said outer casing.

In testimony whereof I have affixed my signature.

JOHN T. CLARK.